United States Patent [19]

Madsen

[11] Patent Number: 4,934,321

[45] Date of Patent: Jun. 19, 1990

[54] ANIMAL RESTRAINTS

[76] Inventor: Alan D. Madsen, 2241 Terrace Lake Rd., Ronan, Mont. 59864

[21] Appl. No.: 274,867

[22] Filed: Nov. 23, 1988

[51] Int. Cl.⁵ ............................................. A01K 1/064
[52] U.S. Cl. ..................................... 119/128; 119/126
[58] Field of Search ............. 119/126 R, 100, 128.02, 119/96; 70/18, 30, 49; 59/86; D30/151

[56] References Cited

U.S. PATENT DOCUMENTS

| | | | |
|---|---|---|---|
| 293,312 | 2/1884 | Iuie et al. | 119/128 |
| 892,546 | 7/1908 | Perkins | 119/128 |
| 1,543,336 | 6/1925 | McIntire | 119/128 |

FOREIGN PATENT DOCUMENTS

| | | | |
|---|---|---|---|
| 484617 | 7/1952 | Canada | 59/46 |
| 436058 | 3/1912 | France | 119/128 |
| 145881 | 6/1954 | Sweden | 119/126 |
| 16697 | of 1913 | United Kingdom | 119/126 |

*Primary Examiner*—John Weiss
*Attorney, Agent, or Firm*—William F. Frank

[57] ABSTRACT

It has been found that weight on each foot tends to diminish the tendency to wander. The present invention employs a chain of sturdy links, a portion of each end of the chain being inserted into a length of rubber tubing and a hook welded to a link on each end of the chain at one end of the tubing to engage and hold a link at the other end of the tubing to form a loop about a foreleg. The tubing not only serves to prevent chafing of the forelegs by the chain but by its inherent resistance to bending provides a biasing force to improve the securing of the engaged link of the chain with the hook.

3 Claims, 1 Drawing Sheet

ANIMAL RESTRAINTS

FIELD OF INVENTION

The present invention is in the general field of animal restraints. More particularly, it is in the field of limiting the movement of untethered animals.

BACKGROUND OF THE INVENTION

Domestic animals such as sheep, cattle, and the horse family appear to have an inherent instinct, tendency or desire to wander if not kept under some form of control. Fenced areas are a logical means of restraint but fenced areas can cover enormous areas of ground. Sheep and cattle generally tend to remain in generalized flock and herd configurations particularly during hours of darkness. Various events can startle the flock or herd and cause them to take off in what can be termed almost uncontrolled flight. However, flocks and herds are usually provided by around-the-clock guards such as dogs and men usually mounted.

The hourse family, except in the wild state, are not in herds but rather are in a horse-on-human relationship. The horse is to carry a rider and so must generally be kept available. The burden members of the horse family such as mules and burros are normally in greater numbers and as such are normally confined in an area either by a rope corral or by tethering to a picket line. Horses, on the other hand, are more likely to be one-on-one with the riders. As such, when the day's work is completed the horses are unsaddled, unbridled and then generally put out to forage. At such times the horse can be tethered to a pin, stake or tree. It is not uncommon for a horse to chew through a tether. The tether can be secured to a log which can be dragged along as the horse wanders in foraging, but this mild restraint will not prevent a horse from moving an undesirable distance from the rider. The most practical form of restraining a horse during such times is to tie or otherwise secure a short line between the horse's forelegs above the hocks.

Such a restraint is called a hobble and causes the horse to move only in very short steps, generally about a foot at a time. Such hobbles are often made from a short length of rope tied around each foreleg. More advanced hobbles have used leather straps around each foreleg coupled together by a very short length of rope. Again, it is not unknown for a horse to sever the interconnecting rope. The use of a wire cable between straps or a light chain prevents the severing of the interconnecting link. The leather straps have on occasion been chewed off by a determined horse. The leather straps are not always easily attached and can deteriorate from use and wetness.

SUMMARY OF THE PRESENT INVENTION

It has been found that weight on each foot tends to diminish the tendency to wander. The present invention employs a chain of sturdy links, a portion of each end of the chain being inserted into a length of rubber tubing and a hook welded to a link on each end of the chain at one end of the tubing to engage and hold a link at the other end of the tubing to form a loop about a foreleg. The tubing not only serves to prevent chafing of the forelegs by the chain but by its inherent resistance to bending provides a biasing force to improve the securing of the engaged link of the chain with the hook.

BRIEF DESCRIPTION OF THE DRAWINGS

The present invention can be seen in the accompanying drawings which are illustrative of the present invention and are not restrictive to what is shown herein.

DETAILED DESCRIPTION OF THE INVENTION

Figure 1:
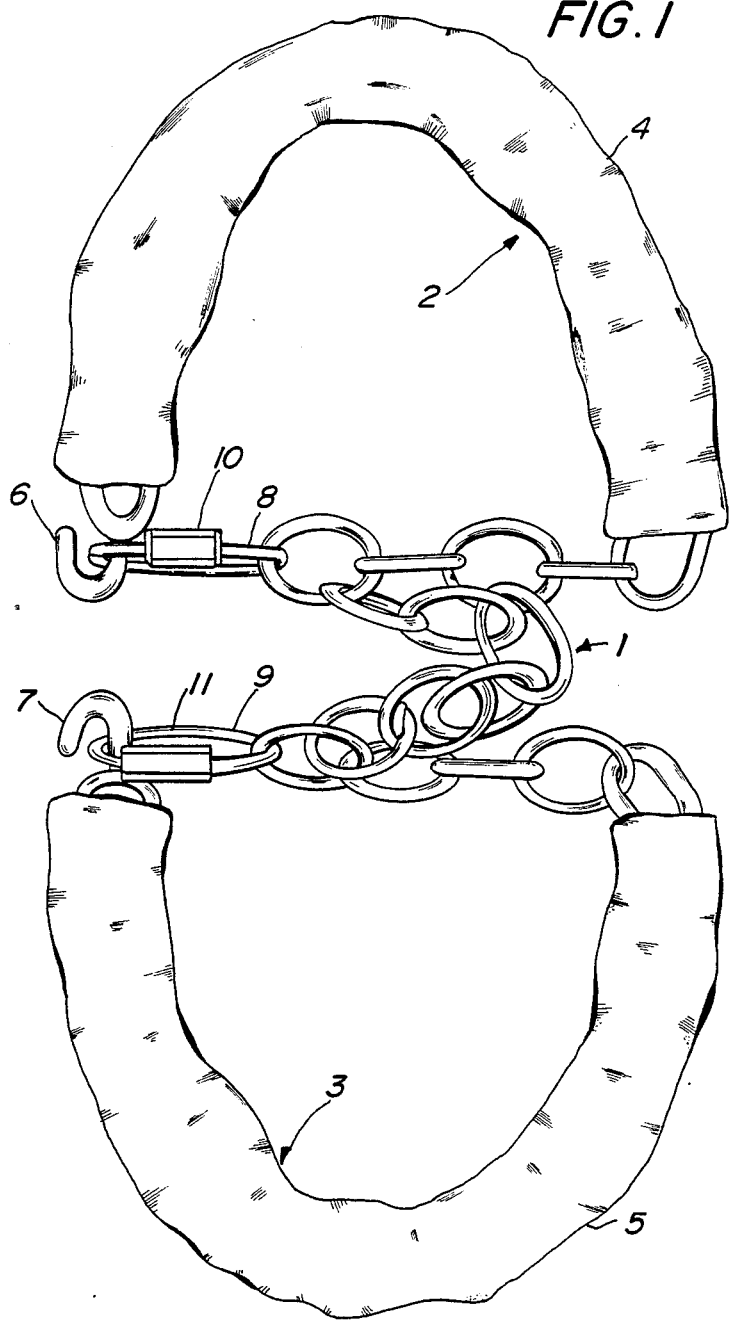
FIG. 1 is a top plan view of the present invention in its operative position, the reverse side being substantially identical.
Figure 2:
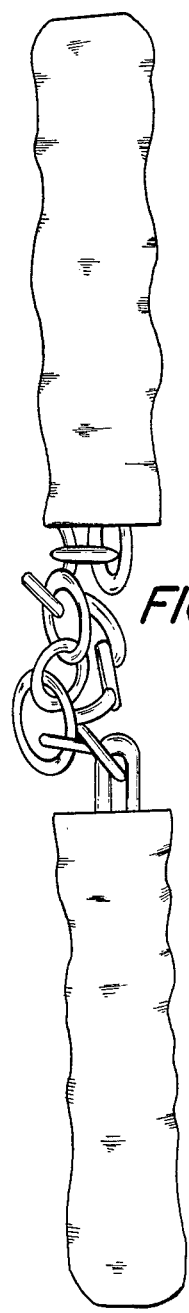
FIG. 2 is an elevation view of the right side of the invention as seen in FIG. 1.

Referring to FIGS. 1-2, the present invention comprises a length of linked chain 1 each end of which is formed into two identical hobbles 2 and 3. Each end of chain 1 is encased in a portion of stiffly resilient tubing 4 and 5 of a material or synthetic rubber-like material having an inherent resistance to being bent into at least a semi-circular configuration. Such resistance may be obtained by use of a tubing having at least a wall thickness of one-sixteenth inch or may be of lesser thickness but having an internal cord reinforcement. The aforesaid resistance to bending is essential to the present invention to provide a reactive pressure against and within each hobble to secure the hobble within the partial circumference formed by engaging each end of the chain extending beyond the inner end of the tubing with the hook 6 and 7, respectively, welded to the chain link just beyond the outer end of said tubing. The engaging may be accomplished by direct engagement of the appropriate link with the related hook. It may also be accomplished by use of a connecting link 8 and 9 separate from the chain per se. Connecting links 8 and 9 comprise a link-like loop connectable at its ends by nut 10 and 11. Nut 10 and 11 provide means to more easily interconnect the chain links outside the inner end of the tubing 4 and 5 to the hooks 6 and 7 in that the connecting links 8 and 9 can be decreased in circumference. This decrease can be carried out in two different but idential resulting effects by the construction of the connecting link itself.

Figure 3:
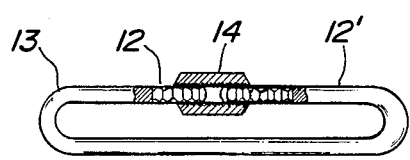
FIG. 3 is a plan view in partial section of one construction of a connecting link used in the present invention.

In one construction seen in FIG. 3, each end 12 and 12' of the open end of the link 13 is threaded in the same direction and the nut 14 is accordingly threaded. This requires that one threaded end of the link carries a length of threads sufficient to allow the nut to be rotated in one direction so as to be completely disengaged from the other end of the link so that the gap between the two ends of the link is available for insertion into an appropriately closely positioned link of the chain. The nut is then rotated in the opposite direction to engage the otherwise unengaged end of the link so as to secure the connecting link in a closed position.

Figure 4:
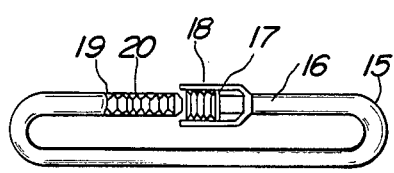
FIG. 4 is a plan view in partial section of a second construction of the connecting link used in the present invention.

In the other construction seen in FIG. 4, one end 16 of the connecting link 15 is unthreaded but carries an abuttment 17 which engages the inner end of nut 18 and acts as a stop to prevent nut 18 from being disengaged from connecting link 15. The other end 19 of link 15 carries a relatively long threaded portion 20 which can engage the threaded interior 21 of nut 18. The engagement of threaded portion 21 with threaded portion 20 not only closes link 15 but by continually rotating nut 18, the end 19 of the link can be drawn toward end 16 to provide a more tensioned coupling of ends 16 and 19, and depending upon the malleability of link 15 can decrease the effective length of link 15 to provide a greater tensioning between the respective link of the chain engaged in its respective hook 6 and 7, thus more securely positioning the respective hobble 2 and 3 by the increased tension made upon the respective links of chain 1 between the respective ends of their respective tubings 4 and 5. This construction can be equated to a conventional turnbuckle in which the rotation of the elongated nut is rotated in one direction and the bolts on each end are drawn into or pushed on outward, depending upon the direction of rotation. It is within the scope of the present invention to use a turnbuckle of appropriate size having a hook on the end of each bolt.

The present invention has been found to be more easily installed on an animal to be indestructive from use, weather or animal depridation than currently used hobbles as previously described.

What is claimed is:

1. A restraint for otherwise untethered members of the equine family comprising a length of link chain, each end portion of said chain being encased in a length of resilient rubber-like tubing having an inherent resistance to bending and of a length to encompass of at least a major circumference of an animal's lower leg, the portion of the animal leg not encompassed by said tubing being encompassed by a portion of said chain, at least a portion of a link of said chain protruding beyond an outer end of each of said tubing lengths, a hook element secured to said link of said chain protruding from said tubing outer end, the portion of said chain extending beyond said tubing end opposite said tubing end having said link with said hook protruding therefrom having an element for securing engagement with said hook element to secure said restraint about the forelegs of said animal, the bending resistance of said tubing providing tension between said hook and said chain portion extending beyond the inner end of said tubing.

2. The animal restraint according to claim 1 wherein said element for securing engagement is one of said links in said chain.

3. The animal restraint according to claim 1 wherein said element for securing engagement is a link-like element having one of its two longer lengths thereof with separated ends, at least one of said ends carrying threads, and a elongated nut encompassing both separated ends, at least one end portion of said nut having internal threads to engage said at least one threaded end of said end of said link-like element.

* * * * *